United States Patent [19]

Kawamura

[11] Patent Number: 5,285,836
[45] Date of Patent: Feb. 15, 1994

[54] 3+7+13 STEEL CORD AND TIRE INCLUDING SAME

[75] Inventor: Kazuhiko Kawamura, Akashi, Japan

[73] Assignee: Sumitomo Rubber Industries, Ltd., Kobe, Japan

[21] Appl. No.: 827,931

[22] Filed: Jan. 29, 1992

[30] Foreign Application Priority Data

Jan. 31, 1991 [JP] Japan .................... 3-56254

[51] Int. Cl.$^5$ .............. B60C 9/00; B60C 9/02; B60C 9/18; D07B 1/06
[52] U.S. Cl. .................... 152/451; 57/213; 57/902; 152/527; 152/556
[58] Field of Search .............. 57/902, 213, 230, 217, 57/223, 232; 152/451, 527, 556

[56] References Cited

U.S. PATENT DOCUMENTS 4,158,946  6/1979  Bourgois ...................... 57/902 X
4,608,817  9/1986  Brandyberry et al. ........... 57/902 X

FOREIGN PATENT DOCUMENTS 0342492  11/1989  European Pat. Off. .
2829205   1/1979  Fed. Rep. of Germany .
54-50640   4/1979  Japan .
58-177702  10/1983  Japan .
59-223503  12/1984  Japan .
61-89390   5/1986  Japan .
3-279432  12/1991  Japan ...................... 57/902
3-279433  12/1991  Japan ...................... 57/902

OTHER PUBLICATIONS

Replacement copies of previously cited Japanese Patent Applications 3-279432 and 3-279433.

Primary Examiner—Michael W. Ball
Assistant Examiner—Adrienne C. Johnstone

[57] ABSTRACT

A steel cord includes a core layer composed of three wires, an intermediate layer composed of seven wires, and an outer layer 12 composed of 13 wires. The space ratio of the intermediate layer is in the range from 25% to 34%. and the space ratio of the outer layer is in the range from 10% to 20%. A tire is manufactured by using the steel cord.

10 Claims, 7 Drawing Sheets

Fig. 3 (COMPARATIVE EXAMPLE)

3+9+15

Fig. 4 (COMPARATIVE EXAMPLE)

3+8+13

Fig. 5 (COMPARATIVE EXAMPLE)

3+8+14

Fig. 6 (COMPARATIVE EXAMPLE)

3+5+13

Fig. 7 (COMPARATIVE EXAMPLE)

4+9+14

Fig. 8 (COMPARATIVE EXAMPLE)

3+8+13

Fig. 9 (COMPARATIVE EXAMPLE)

3+7+13 STEEL CORD AND TIRE INCLUDING SAME

BACKGROUND OF THE INVENTION

1. Field of the Invention

The present invention relates to a steel cord of a three-layer twisted construction and a tire manufactured by using the steel cord.

2. Description of Related Art

Conventionally, various constructions of steel cord of this kind are known. The wires of the steel cord comprise 3+9+15, i.e., a core layer composed of three wires, an intermediate layer composed of nine wires, and an outer layer composed of 15 wires. The wires of each layer consist of filaments of the same diameter. Japanese Laid-Open Patent Publication No. 61-89390 discloses a steel cord including lapping wires, consisting of filaments of smaller diameter, arranged around the outer layer. Japanese Laid-Open Patent Publication No. 54-50640 disclose cord of 2+7+12 or 3+8+13 and free space ratio (the ratio of the wire-free space to the whole space including the wire-free space and the wire-occupied space, i.e. the ratio of a circumference including axes of wires in one layer to an area of the circumference not occupied by the wires) is in the range from 14% to 25%. Japanese Laid-Open Patent Publication No. 58-177702 discloses a steel cord having free space ratio of 0 to 33% in the core layer and 5 to 15% in the intermediate and the outer layers. Japanese Laid-Open Patent Publication No. 59-223503 discloses a steel cord in which the core layer, the intermediate layer, and the outer layer are composed of four wires, nine wires, and 14 wires, respectively.

However, the above-described conventional steel cords have disadvantages. For example, in the steel cord of 3+9+15, it is difficult for rubber to penetrate into the gaps between adjacent filaments. Consequently, filaments are rubbed against each other during the use of a tire. As a result, filaments are worn down or corroded. Thus, the steel cord becomes frail. According to the steel cord disclosed in Japanese Laid-Open Patent Publication No. 54-50640 having the free space ratio of 14% to 25% and the wire construction of 2+7+12 or 3+8+13, it is difficult for rubber to penetrate sufficiently into the inner side of the intermediate layer because the gaps between adjacent wires are small. In the wire construction of 2+7+12, the core layer is composed of two wires. Therefore, the use of a tire including the core layer causes the wires to be bent. As a result, directionality is generated in the rigidity of the wires and the arrangement of the steel cord is likely to be non-uniform.

The above-described Japanese Laid-Open Patent Publication No. 58-177702 also discloses a steel cord in which the core layer is composed of three wires, the intermediate layer is composed of eight wires, and the outer layer is composed of 13 wires and each wire consists of filaments of the same diameter. In this construction although rubber penetrates into the gap between the intermediate layer and the outer layer, it does not penetrate sufficiently into the gap between the intermediate layer and the core layer. As a result, it is likely that wires are corroded and deteriorate in quality.

In a steel cord in which the core layer is composed of four wires, the intermediate layer is composed of nine wires, and the outer layer is composed of 14 wires, it is difficult for rubber to penetrate from the intermediate layer into the core layer and the diameter of the steel cord is inevitably large. As a result, a rubber tends to be thicker to embed the steel cord therein, and consequently, the weight of a tire comprising the steel cord is necessarily great.

SUMMARY OF THE INVENTION

Therefore, an object of the present invention is to provide a steel cord having no nonuniformity in bending direction in which rubber is capable of penetrating sufficiently into a core layer so as to effectively prevent the steel cord from deteriorating due to corrosion, and allowing a tire to be light, and a tire manufactured by using the steel cord.

In accomplishing these and other objects, according to one aspect of the present invention, there is provided a steel cord comprising:

a core layer composed of three wires;

an intermediate layer composed of seven wires, a space ratio of the intermediate layer being in the range from 25% to 34%: and an outer layer composed of 13 wires, a space ratio of the outer layer being in the range from 10% to 20%.

According to the above structure, since the space ratio of the intermediate layer is in the range from 25% to 34%, the space ratio is greater than that of the core layer and that of the outer layer. Accordingly, rubber is capable of smoothly penetrating into the gap between the core layer and the intermediate layer and as a result, the core layer can be effectively prevented from being corroded and as such, the durability of the entire steel cord can be improved and steel cords are durable because the steel cords hardly contact with each other to cause friction. Further, the steel cord can be stabilized in its construction by controlling the twist pitch ratio of the intermediate layer to the core layer and that of the outer layer to the intermediate layer in a specific range, respectively. Then, the space ratio is not less than 25% and the arrangement of filaments can be effectively prevented from becoming non-uniform. As a result, non-uniform directionality does not occur in the filaments and rubber is capable of penetrating sufficiently into the core layer. Thus, the steel cord can be effectively prevented from being corroded and the tire comprising the steel cord can be made to be light.

Further, since the twist pitch ratio of the intermediate layer to the core layer is in the range from 1.6 to 2.2, it is easy to uniformly arrange the filaments of the intermediate layer. In addition, since the twist pitch ratio of the outer layer to the intermediate layer is in the range from 1.4 to 2.0, defective twisting of filaments is not caused.

According to another aspect of the present invention, there is provided a tire manufactured by using a steel cord comprising:

a core layer composed of three wires;

an intermediate layer composed of seven wires, a space ratio of the intermediate layer being in the range from 25% to 34%: and an outer layer composed of 13 wires, a space ratio of the outer layer being in the range from 10% to 20%.

According to the above structure, a radial tire manufactured by using the steel cord of the above construction is capable of displaying all the advantages of the steel cord and the tire can be made to be light.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Before the description of the present invention proceeds, it is to be noted that like parts are designated by like reference numerals throughout the accompanying drawings.

Figure 1:
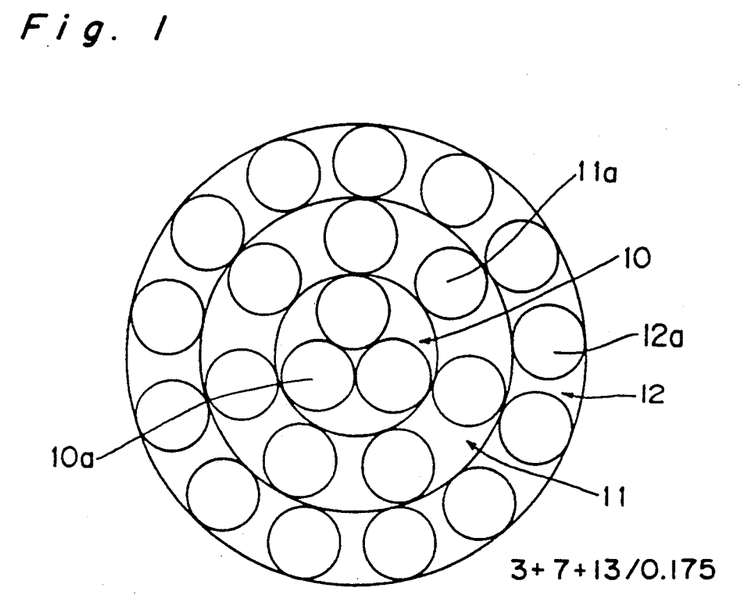
FIG. 1 is an illustration showing a steel cord according to an embodiment of the present invention.
Figure 2:
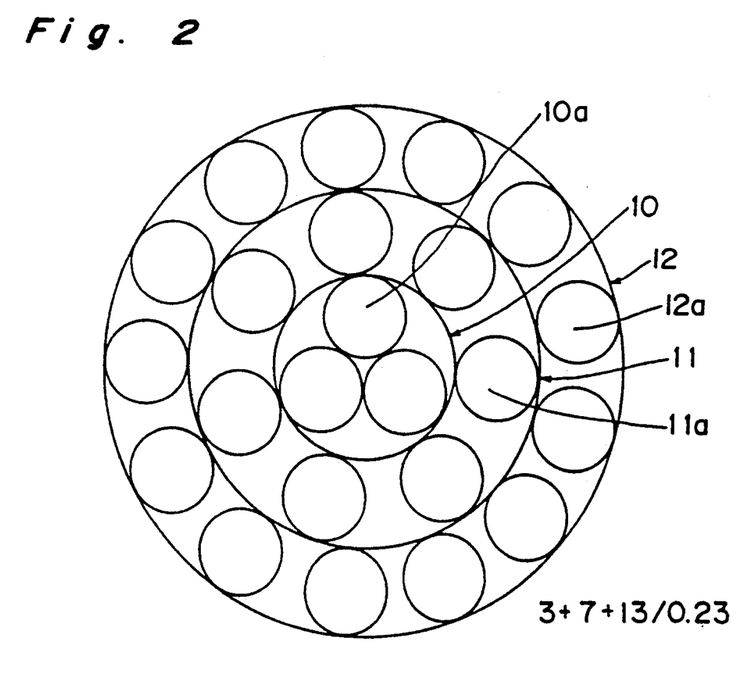
FIG. 2 is an illustration showing a steel cord according to another embodiment of the present invention.
Figure 3:
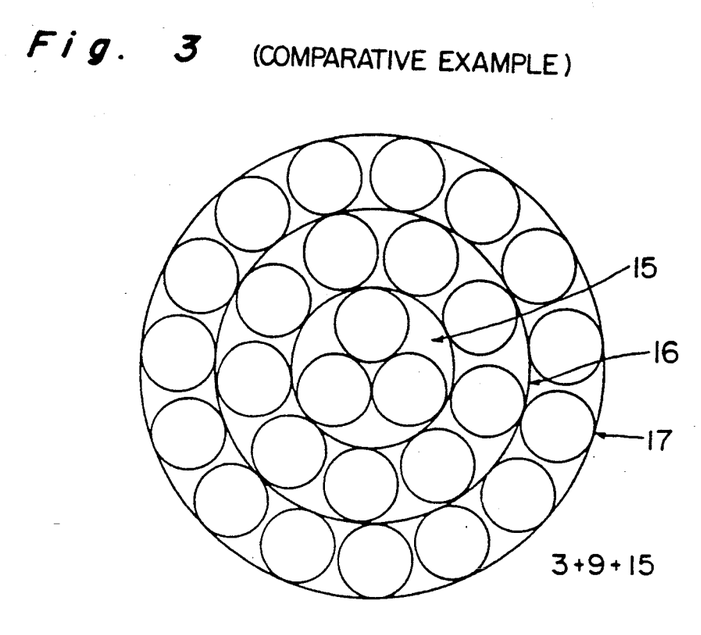
FIG. 3 is an illustration showing a steel cord according to a comparative example 1.
Figure 4:
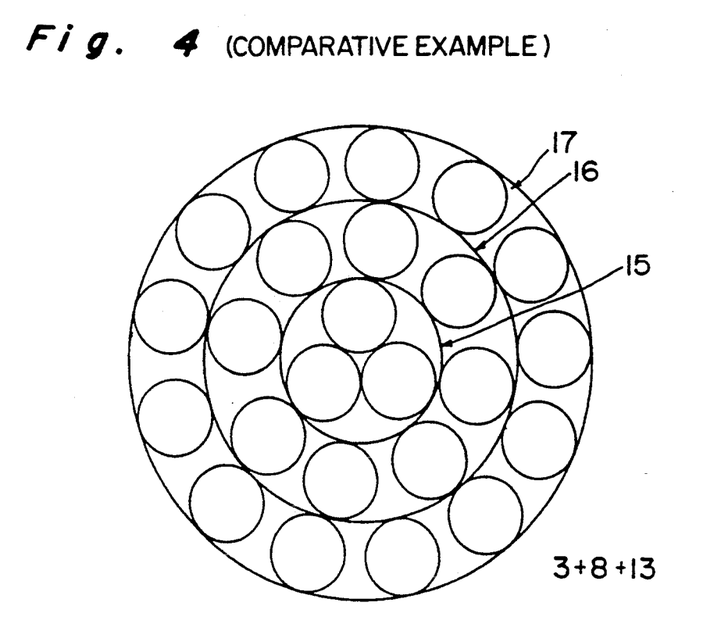
FIG. 4 is an illustration showing a steel cord according to a comparative example 2.
Figure 5:
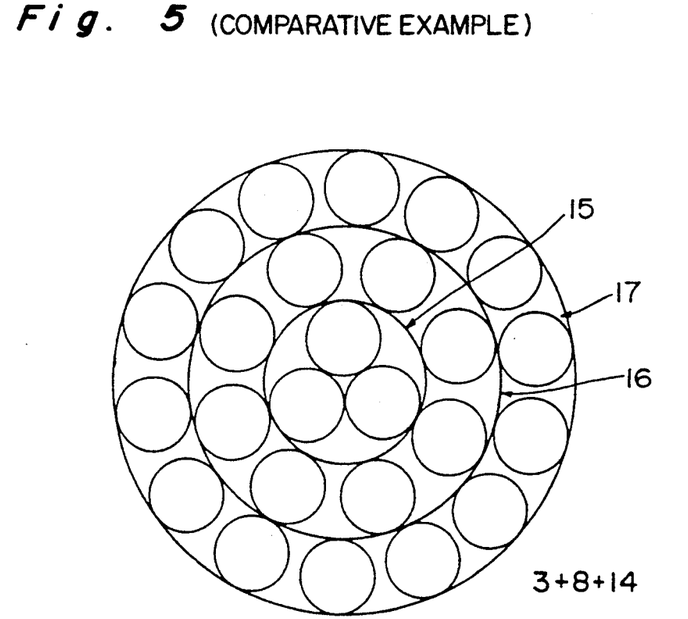
FIG. 5 is an illustration showing a steel cord according to a comparative example 3.
Figure 6:
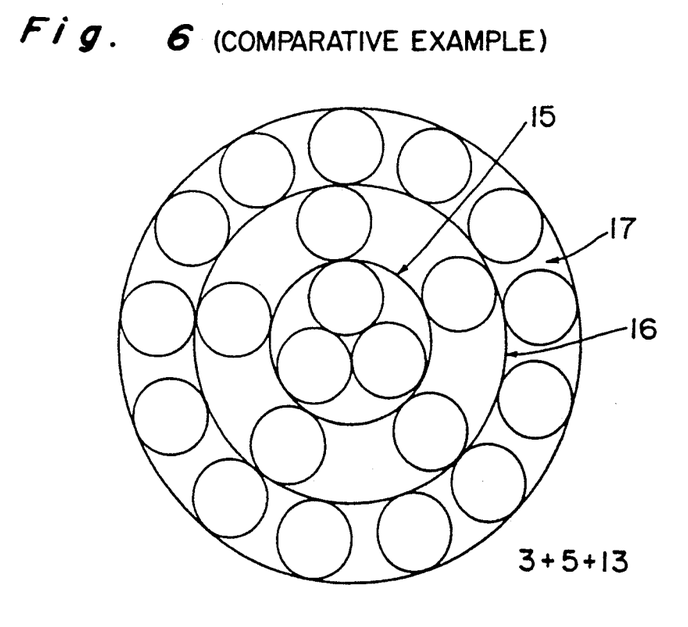
FIG. 6 is an illustration showing a steel cord according to a comparative example 4.
Figure 7:
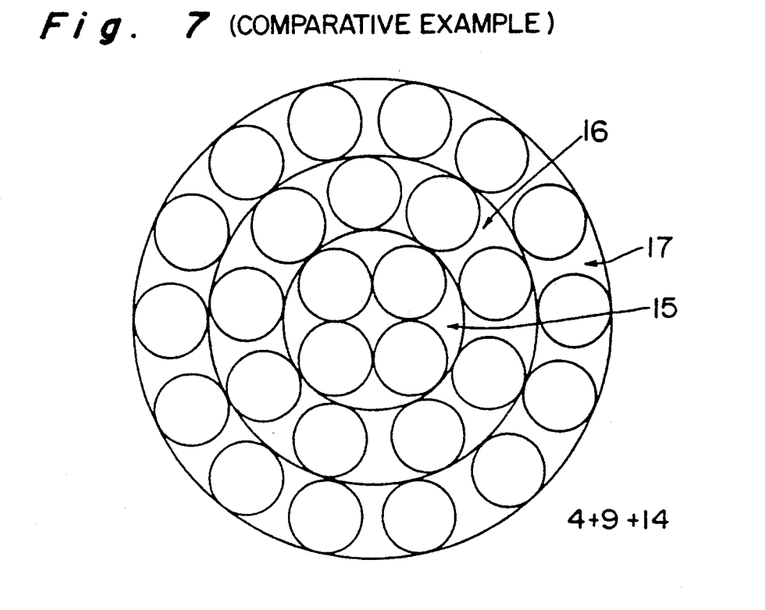
FIG. 7 is an illustration showing a steel cord according to a comparative example 5.
Figure 8:
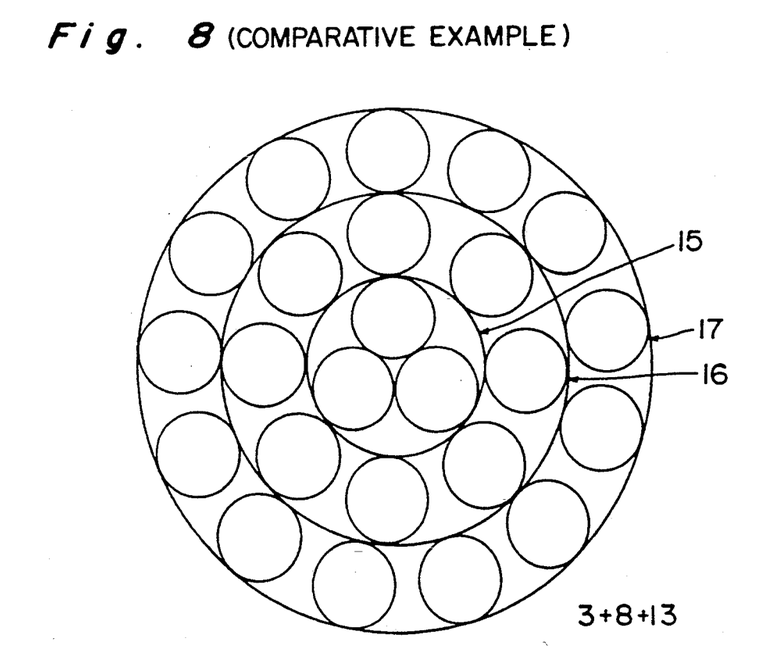
FIG. 8 is an illustration showing a steel cord according to a comparative example 6.
Figure 9:
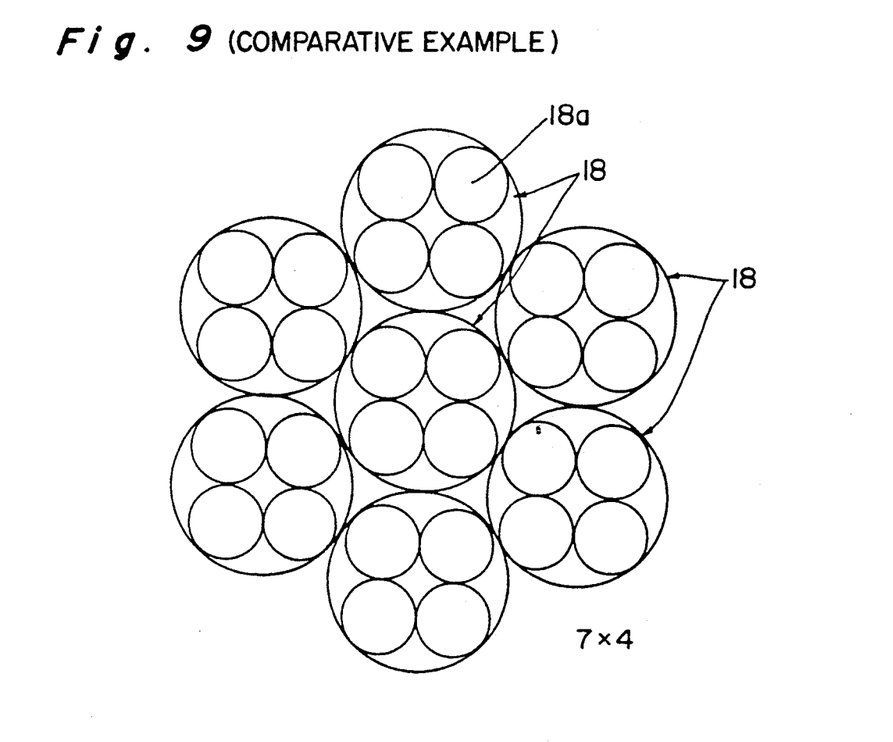
FIG. 9 is an illustration showing a steel cord according to a comparative example 7.

As shown in FIGS. 1 and 2, a steel cord of the embodiment of the present invention comprises a core layer 10 composed of three wires 10a, an intermediate layer 11 composed of seven wires 11a, and an outer layer 12 composed of 13 wires 12a. The space ratio of the outer layer 12 ranges from 10% to 20% and that of the intermediate layer 11 ranges from 25% to 34%. FIG. 1 shows the steel cord in which the diameter of the filament of each wire is 0.175 mm, the twist pitch thereof which is in mm is 5/10/16, and the twist direction thereof is S/S/Z. FIG. 2 shows the steel cord in which the diameter of the filament of each wire is 0.23 mm, the twist pitch thereof which is in mm is 6/12/18, and the twist direction thereof is S/S/Z.

The reason the space ratio of the outer layer 12 is in the range from 10% to 20% is that if the is less than 10%, rubber does not penetrate sufficient into the outer layer 12, and if the space ratio is more than 20%, the arrangement of filaments becomes non-uniform and defective twisting occurs. As a result, the wire 11a of the intermediate layer 11 may project from the outer layer 12 or the arrangement of the outer layer 12 may be excessively non-uniform.

The reason the space ratio of the intermediate layer 11 is in the range from 25% to 34% is that if the space ratio is less than 25%, rubber does not penetrate sufficiently into the intermediate layer 11, and if the space ratio is more than 34%, the arrangement of filaments becomes excessively non-uniform and the durability of the steel cord deteriorates.

Let it be supposed that the twist pitches of the core layer 10, the intermediate layer 11, and the outer layer 12 are (A)mm, (B)mm, and (C)mm, respectively. If, in this condition, the twist pitch ratio (B/A) of the intermediate layer 11 to the core layer 10 is in the range from 1.6 to 2.2, it is easy to uniformly arrange the filaments of the intermediate layer 11. If, in the above condition, the twist pitch ratio (C/B) of the outer layer 12 to the intermediate layer 11 is in the range from 1.4 to 2.0 preferably, undefective twisting of filaments does not occur. That is, if the ratio (B/A) is smaller than 1.6, fretting degree of filaments becomes large and consequently, the steel cord has a poor quality, while if the ratio (B/A) is greater than 2.2, the construction stability deteriorates and as a result, the filaments are likely to be separated from each other. If the ratio (C/B) is smaller than 1.4, the fretting degree becomes large and consequently, the steel cord has a poor quality, while if the ratio (C/B) is greater than 2.0, the construction stability deteriorates and as a result, the filaments are likely to be separated from each other.

According to the above-described embodiment, since the space ratio of the intermediate layer 11 is in the range from 25% to 34%, the space ratio is greater than that of the core layer 10 and that of the outer layer 12. Accordingly, rubber is capable of smoothly penetrating into the gap between the core layer 10 and the intermediate layer 11 and as a result, the core layer 10 can be effectively prevented from being corroded and as such, the durability of the entire steel cord can be improved and steel cords are durable because the steel cords hardly contact with each other to cause friction. Further, the steel cord can be stabilized in its construction by controlling the twist pitch ratio of the intermediate layer to the core layer and that of the outer layer to the intermediate layer in a specific range, respectively. Then, the space ratio is not less than 25% and the arrangement of filaments can be effectively prevented from becoming non-uniform. As a result, non-uniform directionality does not occur in the filaments and rubber is capable of penetrating sufficiently into the core layer. Thus, the steel cord can be effectively prevented from being corroded and the tire comprising the steel cord can be made to be light.

Further, since the twist pitch ratio (B/A) of the intermediate layer 11 to the core layer 10 is in the range from 1.6 to 2.2, it is easy to uniformly arrange the filaments of the intermediate layer 11. In addition, since the twist pitch ratio (C/B) of the outer layer 12 to the intermediate layer 11 is in the range from 1.4 to 2.0, undefective twisting of filaments is not caused.

A radial tire manufactured by using the steel cord of the above construction is capable of displaying all the advantages of the steel cord and the tire can be made to be light.

The present invention is not limited to the above-described embodiment, but various modifications thereof can be made. For example, as the diameters of filaments, two or more different diameters may be adopted. In addition, the twist pitch and twist direction of filaments are not limited to the above-described embodiment.

Comparison tests were conducted by preparing examples 1 and 2 and comparative examples 1 through 7. In example 1, the core layer was composed of three wires, the intermediate layer was composed of 7 wires, and the outer layer was composed of 13 wires and the wires of each layer consisted of filaments of 0.175 mm. In example 2, the core layer was composed of three wires, the intermediate layer was composed of 7 wires, and the outer layer was composed of 13 wires and the wires of each layer consisted of filaments of 0.23 mm. FIGS. 3 through 9 show seven comparative examples in which each steel cord comprised a core layer 15, an intermediate layer 16, and an outer layer 17. The number of wires of the core layer+the intermediate layer+ the outer layer is 3+9+15 (comparative example 1 shown in FIG. 3); 3+8+13 (comparative example 2 shown in FIG. 4); 3+8+14 (comparative example 3 shown in FIG. 5); 3+5+13 (comparative example 4 shown in FIG. 6); and 4+9+14 (comparative example 5 shown in FIG. 7); 3+8+13 (comparative example 6 shown in FIG. 8). The diameters of the filaments composing the wires of the comparative examples 1 through 5 were 0.175 mm while the diameters of the filaments composing the wires of comparative example 6 were 0.23 mm. The steel cord of comparative example 7 was in two-layer construction having seven layers 18 each composed of four wires 18a each consisting of filaments of 0.175 mm in diameter. Ten tires were prepared for each of examples 1 and 2 and each of comparative examples 1 through 7 by using the above-described steel cords as a carcass-ply and a breaker-ply. The tread patterns of these tires were all rib pattern most widely used. The tires were mounted on a track of 10 tons. The wheels of the track comprised two front wheels and four rear wheels including four driving wheels and four idler wheels. The route track ran 200,000 kilometers to conduct the test of penetration degree of rubber and travel tests. In order to use each tire evenly, the tires were used by rotations.

1. Space ratio

The average gap (m) and the average distance (n) between the centers of filaments are described using a first sheath (B1).

Figure 10:
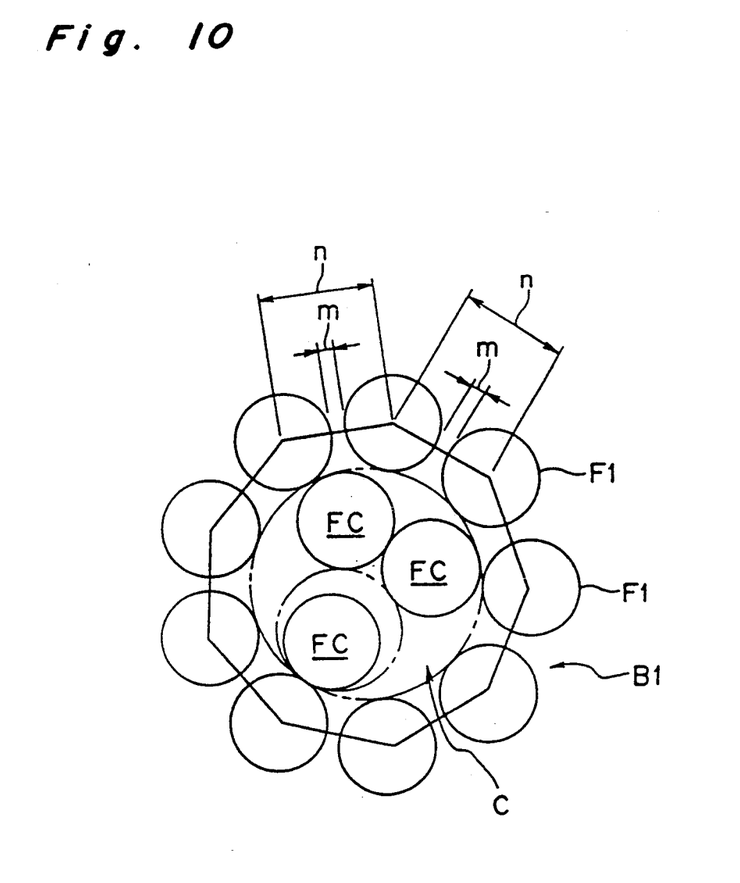
FIG. 10 is an illustration describing space ratio.

That is, as shown in FIG. 10, the average gap (m) means a gap between adjacent steel filaments (F1) when the whole steel filaments (F1) arranged at the first sheath (B1) are uniformly dispersed around a core (C). The average distance (n) between the centers of the adjacent filaments when the filaments are uniformly dispersed and arranged in the above manner.

Then, in the embodiment, since a mold-formed steel filament (FC) is used for the core (C), it is difficult to arrange the steel filaments around the outside of the core. Therefore, the pitch circle of the sheath (B) is considered as a polygon formed by connecting the centers of the steel filaments and then (M/N) is a ratio of a space to the whole length of the polygon.

2. Penetration degree of rubber

Each tire was dismantled to arbitrarily take out three steel cords of 30 cm from the ply and then, filaments were taken out from the outer layer. The amount of rubber which covered the filaments of the intermediate layer was evaluated in six grades of "0" to "5" to define the penetration degree of rubber (intermediate layer/outer layer). Filaments of the intermediate layer were removed to evaluate the amount of rubber which covered the filaments of the core layer in six grades of "0" to "5" to define the penetration degree of rubber (core layer/intermediate layer). The grades of 0, 1, 2, 3, 4, and 5 correspond to 1% to 20%, 21% to 40%, 41% to 60%, 61% to 80%, and 81% to 100%.

3. Fretting

Figure 11:
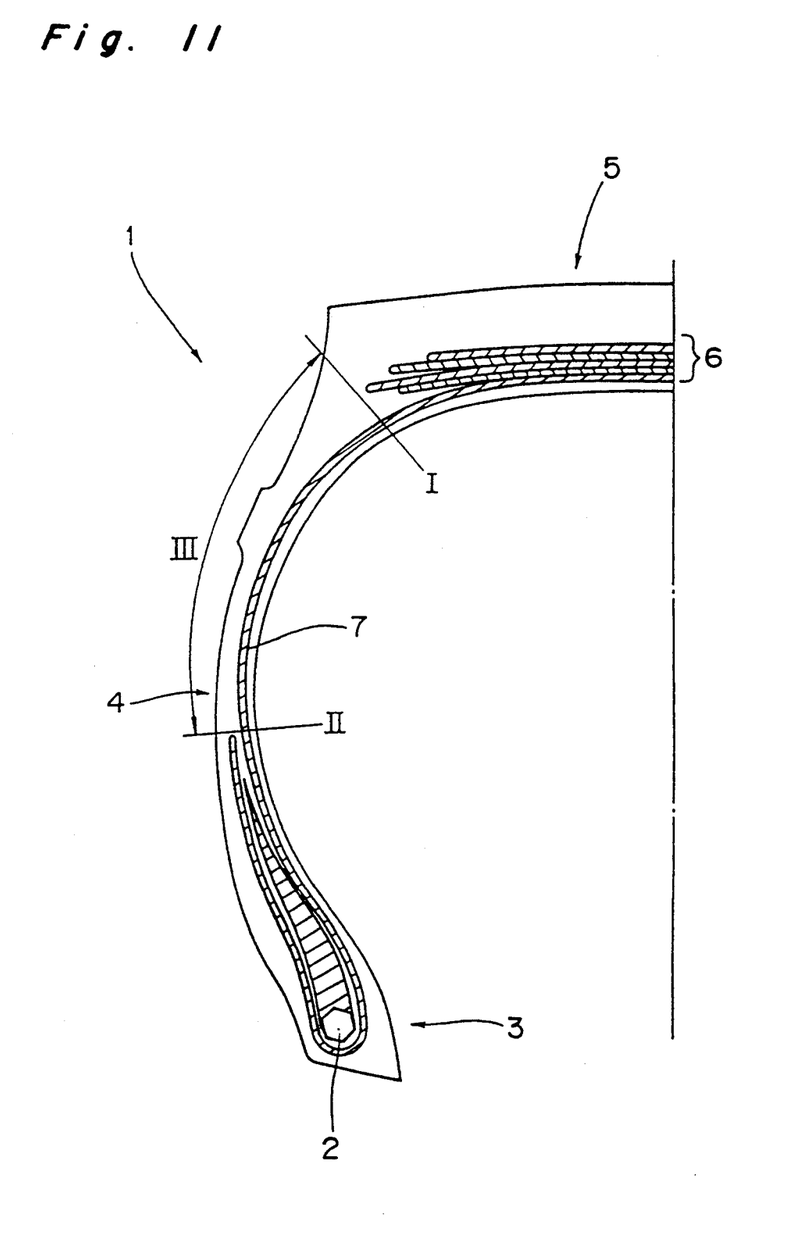
FIG. 11 is an illustration for taking out samples from a tire in making the fretting of filaments.

In order to evaluate the frictional loss degree (fretting) of filaments every "0.5" from grade "0" (good) to grade "5" (bad), plies were taken out from five portions of each tire when the tire was dismantled and steel cords were arbitrarily taken out from each ply, and per tire, plies were taken out from six portions located in the carcass which was moved in the greatest degree, namely, a region (III) between a breaker end (I) and a beater portion (II). In FIG. 11, reference numeral 1 denotes a tire; 2 denotes a bead core; 3 denotes a bead; 4 denotes a side wall; 5 denotes a tread; 6 denotes a belt layer; and 7 denotes a carcass.

The results are shown in Table 1 and 2.

TABLE 1

| construction of steel cord | Comp. 1<br>3 + 9 +<br>15/0.175 | Comp. 2<br>3 + 8 +<br>13/0.175 | Comp. 3<br>3 + 8 +<br>14/0.175 | Example 1<br>3 + 7 +<br>13/0.175 | Comp. 4<br>3 + 5 +<br>13/0.175 |
|---|---|---|---|---|---|
| space ratio (%) of intermediate | 7.5 | 17.7 | 17.7 | 28.0 | 48.6 |
| space ratio (%) of outer | 6.7 | 19.2 | 12.9 | 19.2 | 19.2 |
| penetration degree (core/intermediate) | 0 | 2 | 2 | 4 | 4 |
| penetration degree (intermediate/outer) | 0 | 5 | 3 | 5 | 5 |
| filament fretting score | 4<br>~<br>4 5 | 1.5<br>~<br>2.0 | 2.0<br>~<br>2.5 | 1.0<br>~<br>2.0 | 2.0<br>~<br>4.5 |

TABLE 2

| construction of steel cord | Comp. 5<br>4 + 9 +<br>14/0.175 | Comp. 6<br>3 + 8 +<br>13/0.23 | Example 2<br>3 + 7 +<br>13/0.23 | Comp. 7<br>7 × 4/<br>0.175 |
|---|---|---|---|---|
| space ratio (%) of intermediate | 14.7 | 17.6 | 27.9 | — |
| space ratio (%) of outer | 17.2 | 19.1 | 19.1 | — |
| penetration degree (core/intermediate) | 3 | 2 | 4 | 5 |
| penetration degree (intermediate/outer) | 4 | 5 | 5 | — |
| filament fretting score | 1.5<br>~<br>2.0 | 1.5<br>~<br>2.0 | 1.0<br>~<br>2.0 | 1.5<br>~<br>2.0 |

In the above, core layer is abbreviated as core, intermediate layer is abbreviated as intermediate, and outer layer is abbreviated as outer: penetration degree means penetration degree of rubber; comparative example is abbreviated as Comp; and % means the ratio of wire-free space to area.

In comparative example 1, steel cords used in the carcass were cut in pieces in evaluating the fretting of filaments.

As indicated in Table 1 and 2, the steel cords of examples 1 and 2 made the best grades in the penetration degree of rubber and filament fretting.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A steel cord comprising:

a core layer composed of three wires;

an intermediate layer composed of seven wires, a space ratio of the intermediate layer being in the range from greater than 25% to 34%; and an outer layer composed of 13 wires, a space ratio of the outer layer being in the range from 10% to 20%.

2. The steel cord as claimed in claim 1, wherein a twist pitch ratio of the intermediate layer to the core layer is in the range from 1.6 to 2.2 and a twist pitch ratio of the outer layer to the intermediate layer is in the range from 1.4 to 2.0.

3. The steel cord as claimed in claim 1, wherein a diameter of each wire is 0.175 mm.

4. The steel cord as claimed in claim 1, wherein a twist direction thereof is S/S/Z.

5. The steel cord as claimed in claim 1, wherein a diameter of each wire is 0.23 mm.

6. A tire manufactured by using a steel cord comprising:

a core layer composed of three wires;

an intermediate layer composed of seven wires, a space ratio of the intermediate layer being in the range from greater than 25% to 34%; and an outer layer composed of 13 wires, a space ratio of the outer layer being in the range from 10% to 20%.

7. The tire as claimed in claim 6, wherein a twist pitch ratio of the intermediate layer to the core layer is in the range from 1.6 to 2.2 and a twist pitch ratio of the outer layer to the intermediate layer is in the range from 1.4 to 2.0.

8. The tire as claimed in claim 6, wherein a diameter of each wire is 0.175 mm.

9. The tire as claimed in claim 6, wherein a twist direction thereof is S/S/Z.

10. The tire as claimed in claim 6, wherein a diameter of each wire is 0.23 mm.

* * * * *